(12) United States Patent
Smith et al.

(10) Patent No.: US 6,507,630 B1
(45) Date of Patent: Jan. 14, 2003

(54) CELL FLOW DIVERTER AND FLOW DIVERTER/VORTEX GENERATOR ASSEMBLY FOR BWR SPACERS

(75) Inventors: David G. Smith, Leland, NC (US); James E. Maynard, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/562,866

(22) Filed: May 1, 2000

(51) Int. Cl.[7] ............................................... G21C 3/34
(52) U.S. Cl. ..................... 376/439; 376/435; 376/446
(58) Field of Search ................................. 376/439, 443, 376/441, 442, 446, 435

(56) References Cited

U.S. PATENT DOCUMENTS

| | | | | |
|---|---|---|---|---|
| 3,787,286 A | * | 1/1974 | Anthony | 376/439 |
| 3,809,609 A | * | 5/1974 | Krawiec et al. | 376/439 |
| 3,847,736 A | | 11/1974 | Bevilacqua | |
| 3,933,584 A | * | 1/1976 | Litt | 376/439 |
| 4,224,107 A | | 9/1980 | Delafosse et al. | |
| 4,725,403 A | | 2/1988 | Buettiker | |
| 4,772,447 A | * | 9/1988 | Manson et al. | 376/441 |
| 4,844,860 A | | 7/1989 | Hatfield | |
| 4,913,875 A | | 4/1990 | Johansson et al. | |
| 5,112,571 A | * | 5/1992 | Orii et al. | 376/439 |
| 5,133,927 A | * | 7/1992 | Kadano et al. | 376/441 |
| 5,186,891 A | | 2/1993 | Johansson et al. | |
| 5,247,551 A | * | 9/1993 | Swam | 376/439 |
| 5,272,741 A | * | 12/1993 | Masuhara et al. | 376/439 |
| 5,327,472 A | * | 7/1994 | Kraemer et al. | 376/439 |
| 5,371,768 A | | 12/1994 | Matzner | |
| 5,375,153 A | * | 12/1994 | Patterson et al. | 376/443 |
| 5,416,812 A | * | 5/1995 | Matzner | 376/443 |
| 5,862,196 A | * | 1/1999 | Wolfram | 376/439 |
| 5,875,224 A | | 2/1999 | Smith et al. | |
| 6,148,054 A | * | 11/2000 | Smith et al. | 376/439 |

FOREIGN PATENT DOCUMENTS

| | | | | |
|---|---|---|---|---|
| DE | 2431165 | * | 1/1975 | 376/441 |
| EP | 0 465 925 | * | 1/1992 | 376/443 |
| GB | 1301584 | * | 12/1972 | 376/441 |
| GB | 1382471 | * | 2/1975 | 376/441 |
| JP | 6-230163 | | 8/1994 | |

* cited by examiner

Primary Examiner—Harvey E. Behrend
(74) Attorney, Agent, or Firm—Nixon & Vanderhye

(57) ABSTRACT

A flow diverter is provided for attachment to a spacer cell above a part-length fuel rod. The flow diverter includes a tubular base having a plurality of laterally projecting tabs extending in an upstream direction for diverting flow from between the spacer cells into the volume above the spacer void of a fuel rod. A vortex generator is secured to or forms an integral part with the flow diverter for swirling the flow onto and into the interstices of laterally adjacent fuel rods. The flow diverter and vortex generator are formed of tubular stock. The vanes of the vortex generator are formed by providing slits along the tubular stock and twisting alternating edges of the stock inwardly to form the vanes.

30 Claims, 10 Drawing Sheets

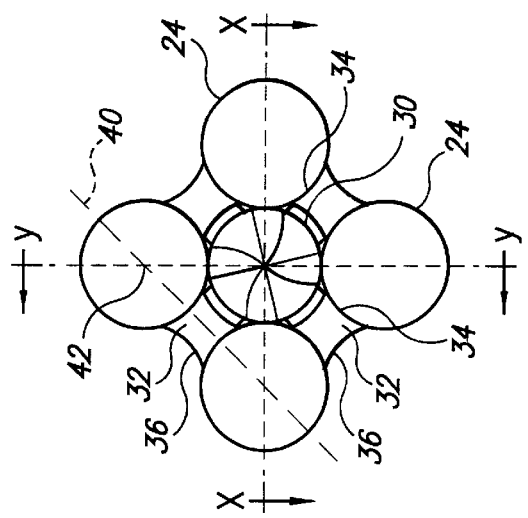
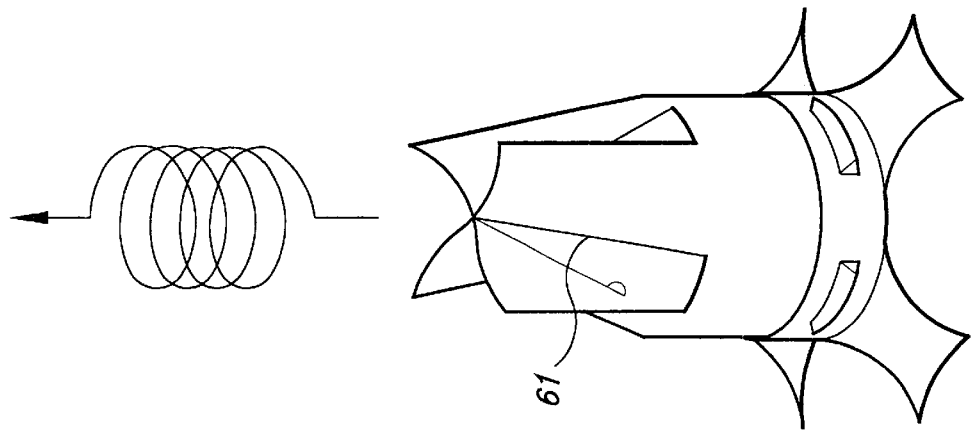
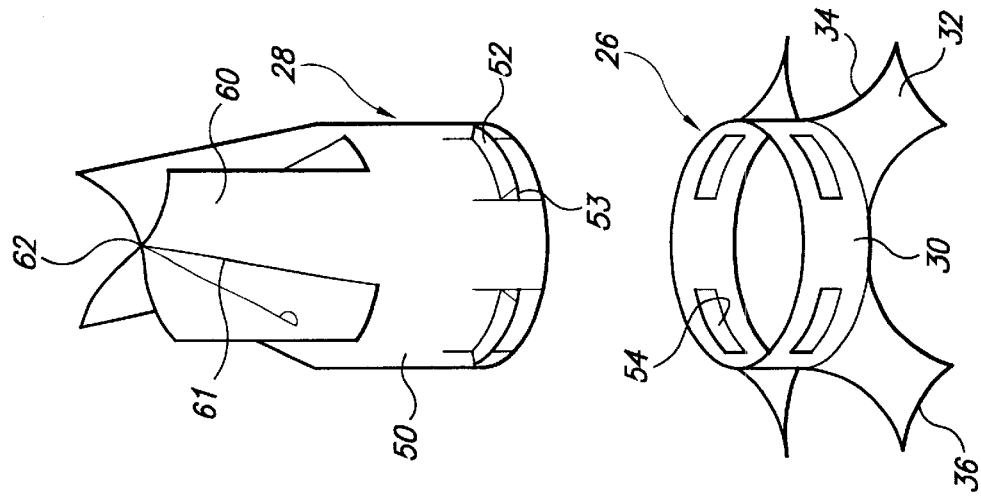

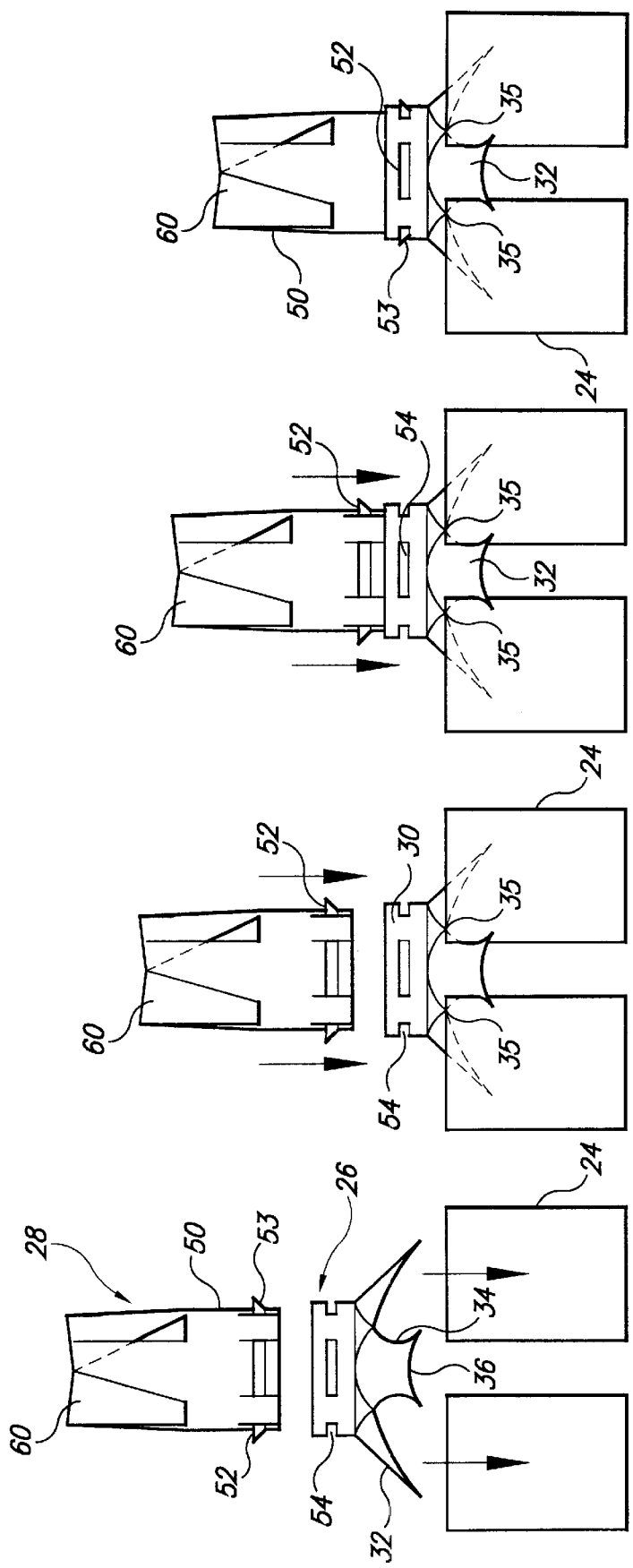

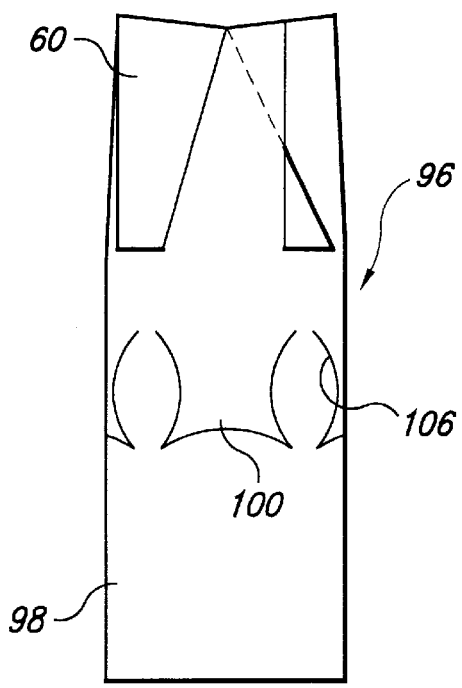 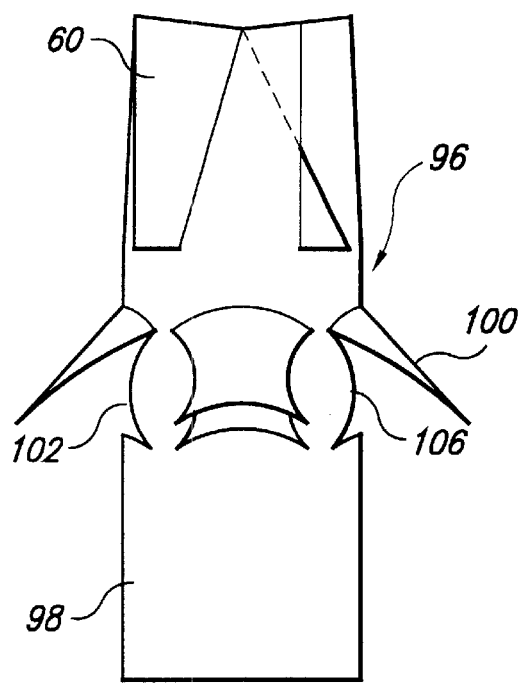
FIG. 14　　　　FIG. 15

CELL FLOW DIVERTER AND FLOW DIVERTER/VORTEX GENERATOR ASSEMBLY FOR BWR SPACERS

BACKGROUND OF THE INVENTION

The present invention relates to a cell flow diverter for use on spacers of a boiling water nuclear reactor for channeling flow through the spacer cells into a vortex generator or about a fuel rod passing through the spacer cell and flow diverter. The invention also relates to the combination of a cell flow diverter and vortex generator.

In boiling water nuclear reactors, each fuel bundle comprises an array of fuel rods passing through axially spaced spacers, all encompassed within a fuel channel. The fuel rods comprises full-length fuel rods with one or more part-length fuel rods interspersed at predetermined locations within the array of full-length rods. Part-length fuel rods terminate at an elevation within the fuel bundle typically below one or more of the uppermost spacers of the bundle. As well known, the termination of the part-length fuel rods creates voids in the upper sections of the fuel bundle bounded by adjacent full-length fuel rods. Various swirler vane arrangements have been proposed for disposition on the upper ends of the part-length fuel rods or on the spacers to circulate the boiling water/moderator in the void regions. Certain problems are associated with these prior swirl vane arrangements which include difficulty of fabrication, attachment of the swirl vanes to the spacer, both during initial fabrication and in situ installation and removal of the swirl vane after fuel bundle irradiation. There is therefore a need for a flow diverter for channeling the flow into desired locations and particularly a flow diverter/vortex generator assembly for directing the boiling water/moderator flowing through the spacers and into the voids above part-length rods for flow about and into the interstices of adjacent upper regions of full-length fuel rods.

BRIEF SUMMARY OF THE INVENTION

In accordance with a preferred embodiment of the present invention, there is provided a flow diverter for diverting flow between cells of a spacer for flow within the diverter wherein the diverter channels the flow into a vortex generator for distributing boiling water/moderator onto and into the interstices of adjacent full-length fuel rods adjacent void regions or channel the flow between the cells of the spacer onto a fuel rod passing through the spacer cell mounting the flow diverter. The flow diverter preferably includes a generally cylindrical tube for overlying a cell of a spacer. The flow diverter tube includes a plurality of tabs projecting laterally from the tube generally at perpendicular locations about the axis of the tube. Each tab extends diagonally relative to the rectilinear array of spacer cells into spaces between adjacent cells, i.e., between the rows and columns of cells. For example, each tab extends diagonally into the space between adjacent cells a distance such that the outer edge of the tab extends beyond a straight line interconnecting center lines of diagonally adjacent cells. With the tab occupying the area diagonally between the diagonally adjacent cells and being angled laterally outwardly from the diverter in an axial upstream direction, boiling water/moderator is diverted from the interstices of the spacer cells through the tubular diverter for flow in an axial downstream direction at a spacer cell location generally corresponding to the cell location of the diverter. One beneficial effect of this construction and location of the flow diverter is that the coolant flow increases in pressure and velocity as it passes through the flow diverter. This is particularly effective in "supercharging" the flow when the diverter is disposed about a fuel rod.

In a preferred embodiment of the present invention, the flow diverter is employed in conjunction with a vortex generator. In a first form of vortex generator, a cylindrical tube is provided having a plurality of slits opening through a downstream end of the tube. For example, where four vanes are to be provided, eight slits are provided and each vane defined by adjacent slits in the vortex generator tube is twisted such that one edge lies inboard of the circumference of the tube and the opposite edge lies along the circumference of the tube. Tube portions between the slits forming the vanes are removed. The tips of the vanes meet at the central axis of the vortex generator and may be welded to one another at that location. The slit size and shape of the vanes ensure that the vanes of the vortex generator do not extend laterally beyond the periphery of the vortex generator tube.

To secure the vortex generator to the flow diverter, the tube of the flow diverter is preferably provided with a series of circumferentially spaced slots. The base of the vortex generator is provided with spring tabs angled such that upon displacement of the vortex generator toward the flow diverter, e.g., downwardly onto the flow diverter, the spring tabs deflect first inwardly and then outwardly into the slots of the flow diverter to secure the vortex generator to the flow diverter. In another form, the flow diverter and vortex generator may have complementary threads whereby the vortex generator may be screwthreaded onto the flow diverter. The vanes and threads are configured such that the swirling of the flow afforded by the vortex generator is in swirl direction tending to tighten the vortex generator on the flow diverter.

In a further preferred embodiment hereof, the flow diverter comprises a cylindrical tube wherein the tabs are struck from the tube for extension into the interstices between adjacent spacer cells with the vortex generator forming an integral part of the flow diverter tube. The vortex generator is similar to the embodiment first described above without its interconnection with the flow diverter.

In a still further form hereof, the flow diverter may be secured to the spacer, for example, by welding, in a cell location which receives a fuel rod. In this manner, the boiling water/moderator flows from between the spacer cells into the tube of the diverter and into an annular space between the diverter and fuel rod to maintain flow contact with the fuel rod.

In a preferred embodiment according to the present invention, there is provided a flow diverter for diverting flow between cells of a spacer in a nuclear fuel bundle into the diverter and in a downstream flow direction relative to the spacer, the spacer having a rectilinear array of cells, comprising a cylindrical tube for overlying a spacer cell and having an axis, a plurality of tabs projecting laterally from the cylindrical tube at perpendicular locations relative to one another about the axis for disposition in the spacer between diagonally adjacent cells of the rectilinear array thereof, the tabs forming with the axis acute angles for diverting flow through the spacer into the cylindrical tube.

In a further preferred embodiment according to the present invention, there is provided a flow diverter/spacer combination for diverting flow between cells of a spacer in a nuclear fuel bundle for flow within the diverter and in a downstream flow direction relative to the spacer, comprising a spacer having generally cylindrical side-by-side cells in cell positions arranged in parallel rows and parallel columns forming a generally rectilinear array of cells, the cells having parallel axes, a cylindrical tube overlying a cell and having an axis generally coincident with the axis of the cell, a plurality of tabs projecting laterally from the cylindrical tube at perpendicular locations relative to one another about the axis, each tab extending diagonally relative to the rectilinear array of columns and rows of the cells into spaces between diagonally adjacent cells, the tabs forming with the axis acute angles opening in an upstream direction for diverting flow through openings between the cells of the spacer into the cylindrical tube.

BRIEF DESCRIPTION OF THE DRAWINGS

FIG. 3 is a perspective view illustrating a preferred form of flow diverter and vortex generator prior to assembly with one another;

FIG. 4 is a view similar to FIG. 3 illustrating the flow diverter and vortex generator in assembled condition;

FIG. 5 is a top plan view thereof;

FIGS. 6–9 illustrate a sequence of steps for interconnecting the flow diverter, spacer cells and the vortex generator;

FIGS. 14 and 15 illustrate the steps for forming the unitary flow diverter and vortex generator of FIG. 13;

DETAILED DESCRIPTION OF THE INVENTION

Figure 1:
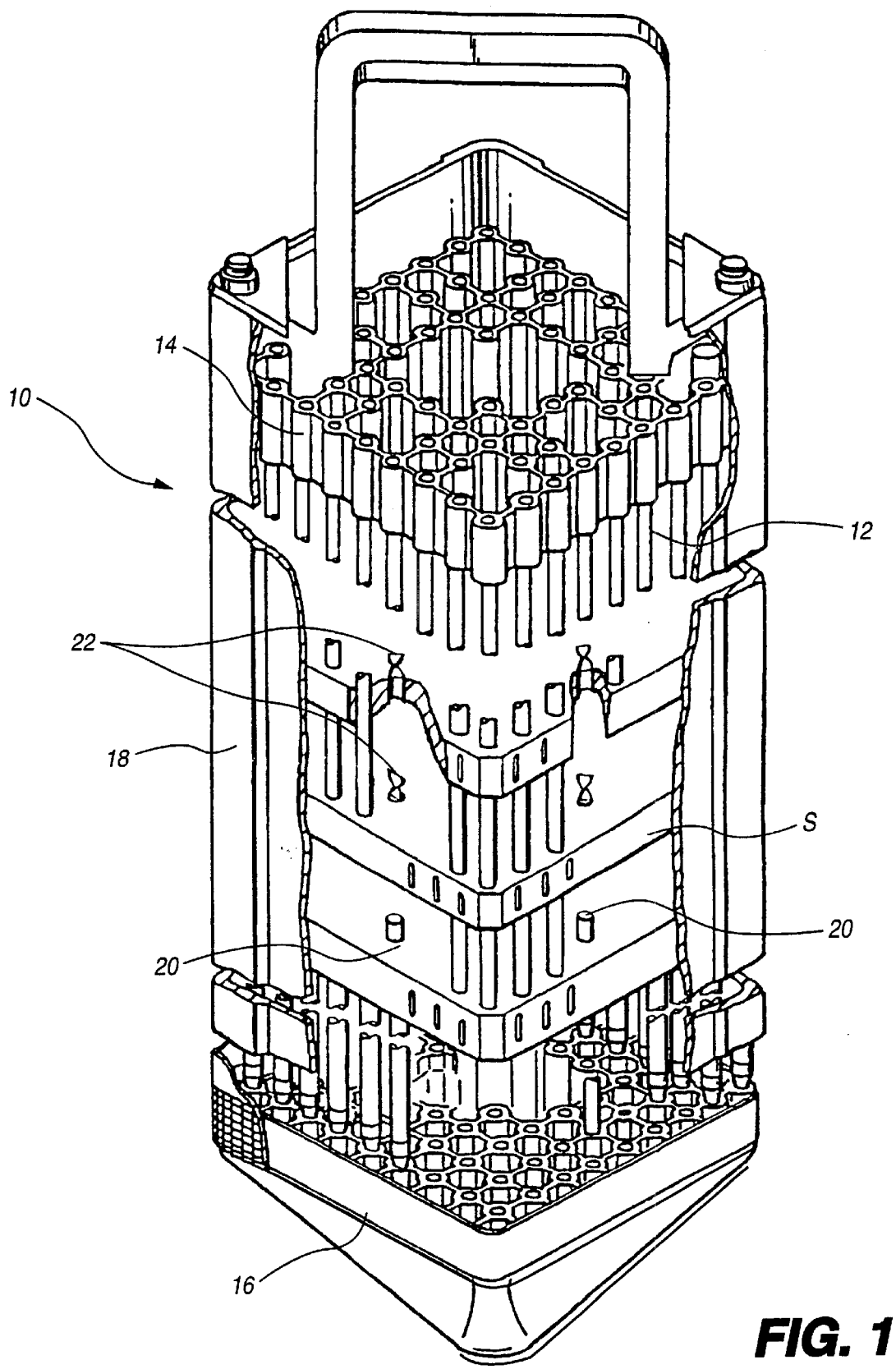
FIG. 1 is a schematic perspective view with parts broken out and in cross-section of a conventional boiling water fuel bundle.

Referring now to the drawings, particularly to FIG. 1, there is illustrated a conventional boiling water/nuclear fuel bundle, generally designated 10, comprised of a plurality of fuel rods 12 disposed in a rectilinear array thereof and extending between upper and lower tie plates 14 and 16, respectively. As illustrated, a plurality of spacers S are axially spaced one from the other at various elevations along the fuel bundle. The fuel rods and spacers are enclosed within a fuel channel 18. As conventional, the boiling water/moderator flows upwardly through the fuel bundle about the fuel rods and through the cells of the spacers S, generating steam for the generation of power. Also illustrated in FIG. 1 are part-length fuel rods 20 which terminate at their upper ends short of the upper tie plate and typically below one or more of the upper spacers. Also illustrated in FIG. 1 are a plurality of conventional swirl vanes 22 disposed on the downstream side of the spacers at spacer cell locations above the part-length rods 20.

Figure 2:
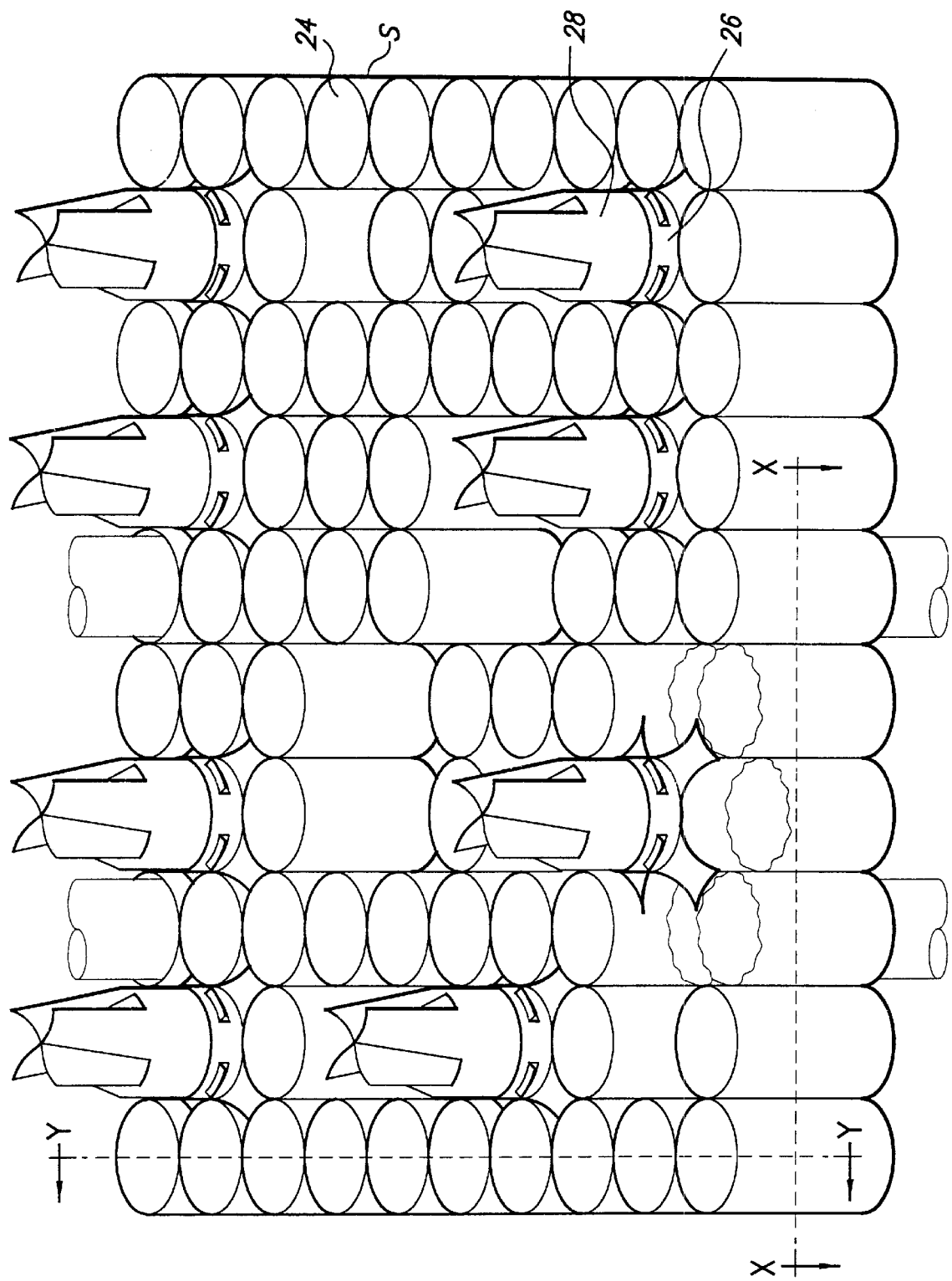
FIG. 2 is a schematic perspective view illustrating a spacer of a ferrule type having a flow diverter and vortex generator assembly constructed in accordance with a preferred embodiment of the present invention at specified cell locations.

Referring to FIG. 2, there is illustrated a representative spacer S which schematically illustrates cells in a rectilinear horizontal array of cells. For convenience, the rectilinear array is characterized by perpendicularly related rows and columns of cells 24, represented by x and y axes, respectively, in FIG. 2. In the illustrated spacer, a 10×10 array of spacer cells is shown with ten cells in each row (except for water rod locations, not shown). The cells may be of the ferrule type, i.e., short cylindrical tubes for receiving the fuel rods or may comprise other types such as disclosed in U.S. Pat. Nos. 5,740,218 and 5,727,039. Suffice to say that the present invention can be used with different and various configurations of cells.

In FIG. 2, there is illustrated a plurality of flow diverters 26 in combination with vortex generators 28. Referring to FIG. 3, each flow diverter 26 comprises a cylindrical tube 30, preferably corresponding in diameter, in the illustrated form, to the diameter of the cell 24 (FIG. 2). The flow diverter 26 includes a plurality of tabs 32 which project laterally outwardly of the tube 30. The tabs 32 are also inclined relative to the axis of the tube 30 in an upstream direction when disposed over a cell 24. Thus, the tabs 32 are inclined downwardly, as illustrated in FIGS. 2 and 3 and form acute angles with the axis of the tubular cells 24. The lateral margins 34 of each tab 32 are shaped complementary to the arcuate outside surfaces of diagonally adjacent cells as illustrated in FIG. 5, while the distal ends 36 of the tabs 32 are likewise arcuately configured for engagement against a diagonally adjacent cell which lies both in a different row and column as the flow diverter. As best illustrated in FIG. 5, with this configuration, the tabs 32 may be interposed in the spaces between the orthogonally related rows and columns of spacer cells. To secure the flow diverter 26 to the spacer, the diverter may be welded to each of the adjacent cells in the corresponding column and row whereby the tabs 32 abut the adjacent cells. The weld joints are denoted 35 in FIGS. 7–9.

Also as best seen in FIG. 5, the distal ends 36 of the tabs 32 extend laterally outwardly of the diverter tube 30 a distance beyond a straight line 40 drawn between center lines of diagonally adjacent cells. That is, the distal ends 36 of tabs 32 extend beyond straight lines 40 extending between the center axes 42 of diagonally adjacent cells and preferably abut the cell walls of a second set of diagonally adjacent cells in columns and rows not common to the column and row containing the flow diverter. With this configuration, it will therefore be appreciated that the flow through the spaces between the diagonally adjacent cells is completely diverted into the tube 30 of the diverter 26.

Also illustrated in FIGS. 2–5 is a vortex generator 28 formed of a generally cylindrical tube 50 of a diameter for reception within the tube 30 of the flow diverter 26. The lower end or base of the tube 50 has laterally outward spring tabs 52 having lower surfaces 53 inclined to the axis through the tube 50. At like spacing about tube 30 of diverter 26 as the spring tabs 52 lie about tube 50, there are provided a plurality of slots 54 through diverter tube 30. By axially displacing the vortex generator 28 onto the flow diverter 26 as illustrated in sequence in FIGS. 8 and 9, the spring tabs 52 may be deflected first inwardly by engagement of the inclined surfaces 53 against the margin of tube 30 and then deflected outwardly in the slots 54 upon registration with the slots. The spring tabs/slot engagement thus maintain the vortex generator 28 assembled on the flow diverter 26 (FIG. 4).

To generate a swirling flow through the flow diverter and vortex generator assembly, a plurality of swirler vanes 60 are provided adjacent the upper end of the vortex generator 28. The vanes are formed by slitting the generally cylindrical tube 50 in an axial direction through one end thereof and twisting inwardly one edge of each vane 60. For example, where four vanes 60 are used, eight slits 61 are formed through the end of tube 50. Tube material between alternate pairs of slits is removed and the remaining vanes are twisted so that one edge inclines inwardly to meet at its end the inner edges of other vanes. By forming the vanes in this manner, the vanes lie within the tubular envelope defined by tube 50, i.e., the vanes do not extend outside the periphery of tube 50 and lie within its peripheral confines. Preferably, the tip of each vane 60 along its inner edge contacts one another at an apex 62. The apices of the vane 60 may be welded at that location 62. Thus, it will be appreciated that the vanes impart a swirling motion to the boiling water/moderator flowing upwardly in the fuel bundle through the flow diverter 26 and into vortex generator 28, i.e., flowing in a downstream direction. Thus, a swirl-type flow above the assembly and in the void region above the part-length fuel rods is achieved. Note that by employing a suitable tool, not shown, the spring tabs 52 can be deflected inwardly to release the vortex generator from the flow diverter in situ and even after irradiation.

To install the flow diverter/vortex generator, the flow diverter 26 is first applied over the upper or downstream end of a cell as illustrated in FIG. 6. Note that the tabs 32 extend between the diagonally adjacent cells and that their distal ends 36 are in contact with diagonally adjacent cells (FIG. 5). Welds are formed between the sides of the tubes 30 and the adjoining cells 24 in the rows and columns to secure the flow diverter to the spacer. The vortex generator 28 is then displaced axially on top of the flow diverter as illustrated in FIG. 8. Thus, as the lower end of tube 50 is received within tube 30, the springs 52 deflect inwardly and then, outwardly into slots 54 upon registration therewith to secure the vortex generator to the flow diverter as illustrated in FIG. 9.

Figure 12:
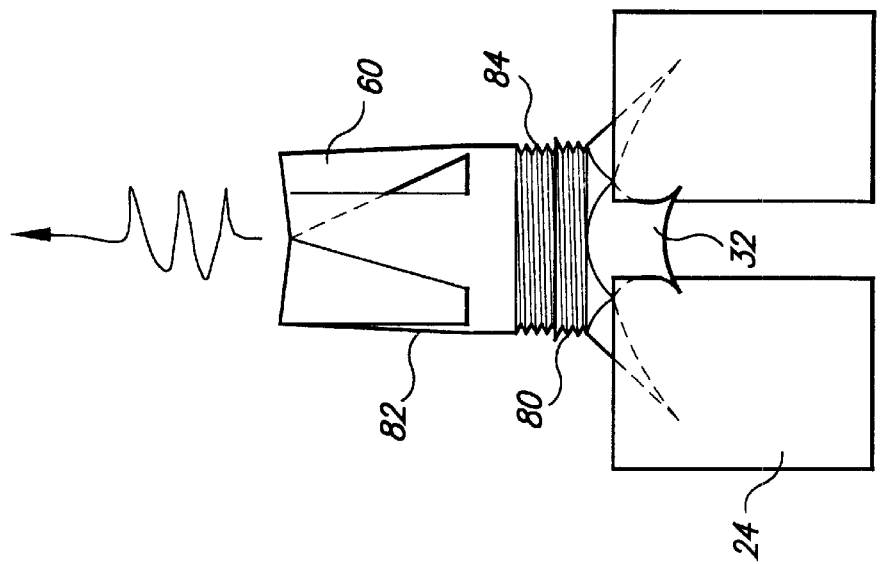
FIG. 12 is a side elevational view thereof in the assembled condition in a spacer.
Figure 11:
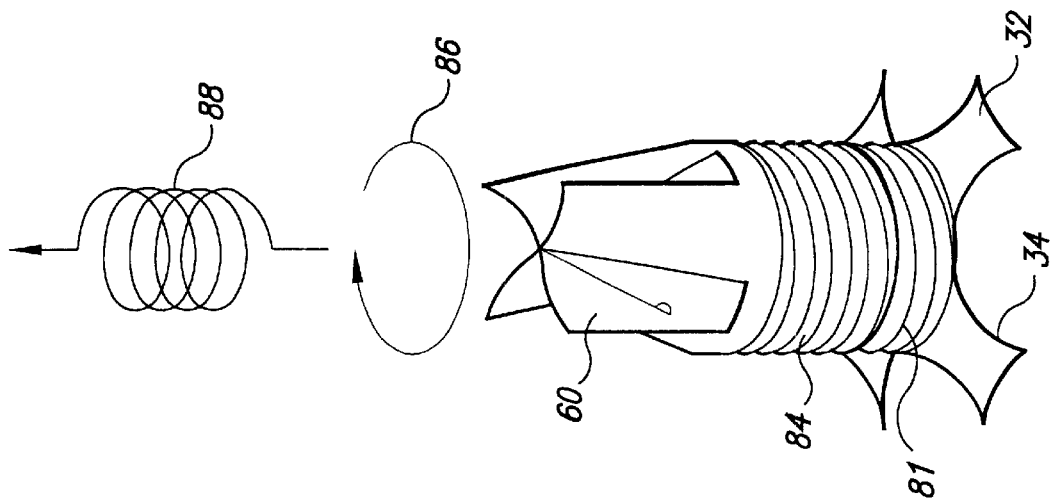
FIG. 11 is a perspective view thereof in an assembled condition.
Figure 10:
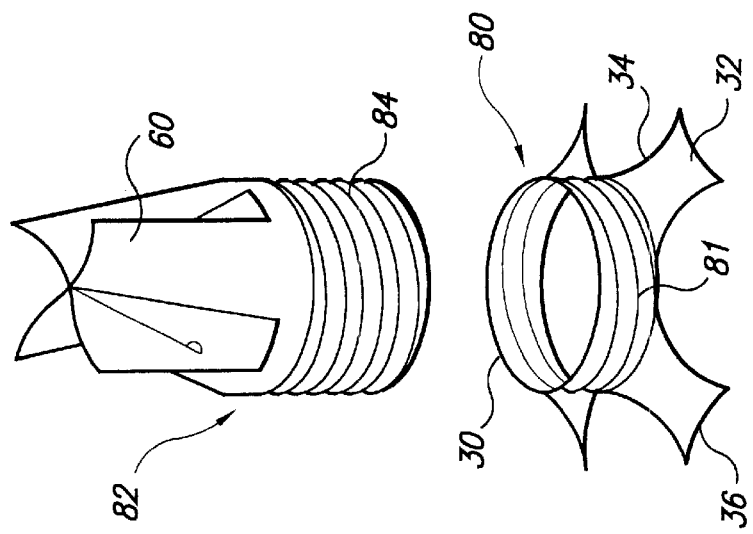
FIG. 10 is a perspective view of a flow diverter and vortex generator according to another preferred embodiment hereof.

Turning now to the embodiment hereof illustrated in FIGS. 10–12, the flow diverter 80 is constructed similarly as the flow diverter 26 except that, instead of slots 54, threads 81 are formed about the tube 30, the tabs 32 being identical as those of the previous embodiment. Vortex generator 82 is likewise formed similarly as the vortex generator 28, except that spring tabs 52 are omitted in favor of complementary threads 84. The vortex generator 82 thus may be threaded into the flow diverter 80 and released therefrom by unthreading action in situ and after irradiation. The vanes 60 of vortex generator 82 are formed similarly as the vanes of the prior embodiment. Note also that the reaction force on the vortex generator 82 indicated by the arrow 86 resulting from swirling the flow in the direction illustrated by the arrow 88 in FIG. 11 tends to tighten the threads 84 of the vortex generator 82 about the threads 81 of the flow diverter 80. The threads 81 and 84 preferably comprise male/female threads, respectively, although the threads may be arranged vice-versa.

Figure 13:
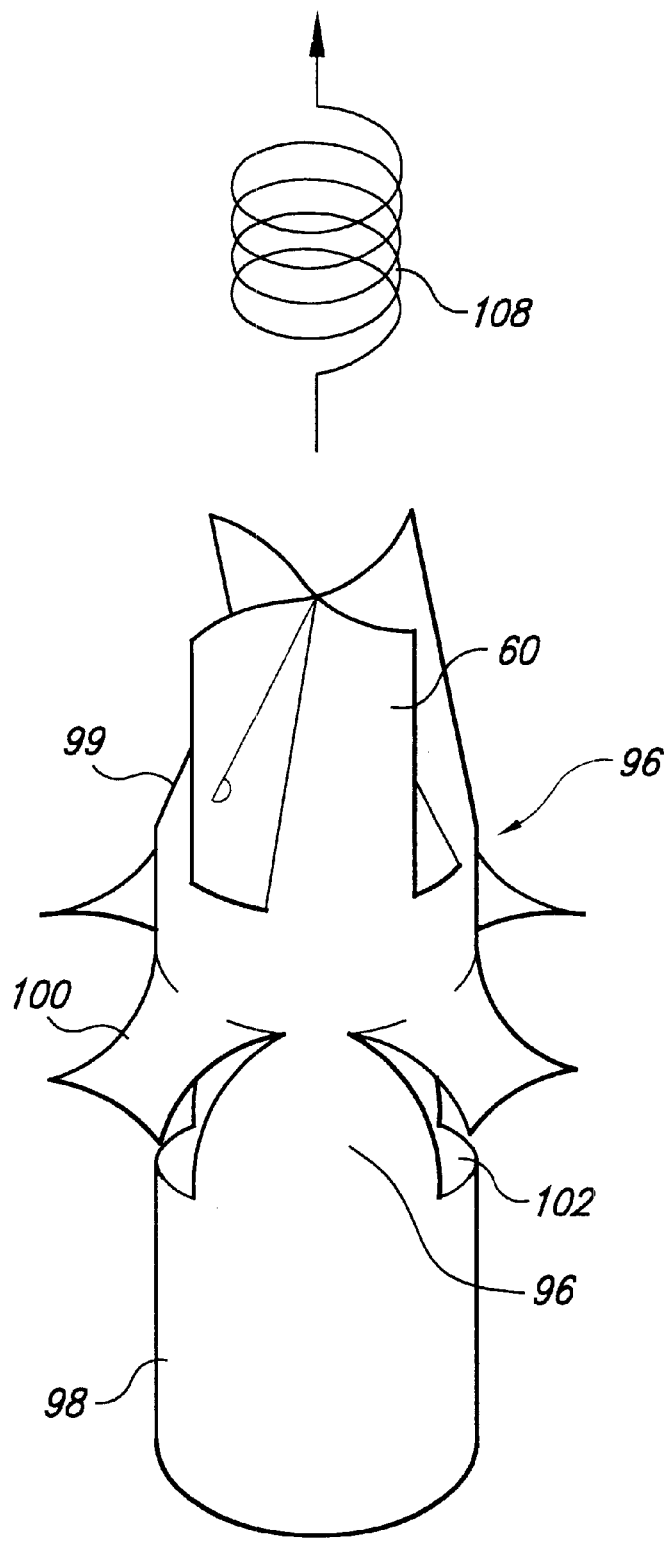
FIG. 13 is a perspective view of a unitary cell flow diverter and vortex generator.

Referring now to the embodiment hereof illustrated in FIGS. 13–15, there is illustrated a combined flow diverter/vortex generator and cell assembly 96 formed of a single integral piece of tubular sheet metal stock. For example, the tabs 100 of like configuration as the tabs 32 of the first embodiment are struck from the tubular body 98 to project laterally outwardly and at an angle to the tube axis as illustrated from a review of FIGS. 14 and 15. The tabs 100 have side and end configurations similarly as in the tabs 32 of the first embodiment, but leaving holes 102 in the tubular body 98 to receive the deflected flow generated by the tabs for flow in a downstream direction within the tubular body. The upper end of the tubular body 98 comprises the vortex generator 99 (FIG. 13) which includes vanes 60 constructed similarly as the vanes of the first embodiment. In this form, the lower tubular base of the assembly below the slots 102 forms a cell of the spacer disposed above a part-length fuel rod. That is, the tubular assembly 96 is substituted for a tubular cell 24 in the spacer S and forms an integral part therewith, i.e., by welding. Consequently, the boiling water/moderator flows in a downstream direction through the tubular body 98 and is joined by the deflected flow caused by the projecting tabs 100 for flow through the assembly and the vortex generator portion thereof. The vanes 60 impart the swirling motion to the flow, as represented by the circular arrow 108 in FIG. 13, similarly as in the first embodiment. FIG. 14 illustrates the cuts 106 formed in the tubular body 98 such that the tabs may be struck and laterally projected from the body as illustrated in FIG. 15.

Figure 16:
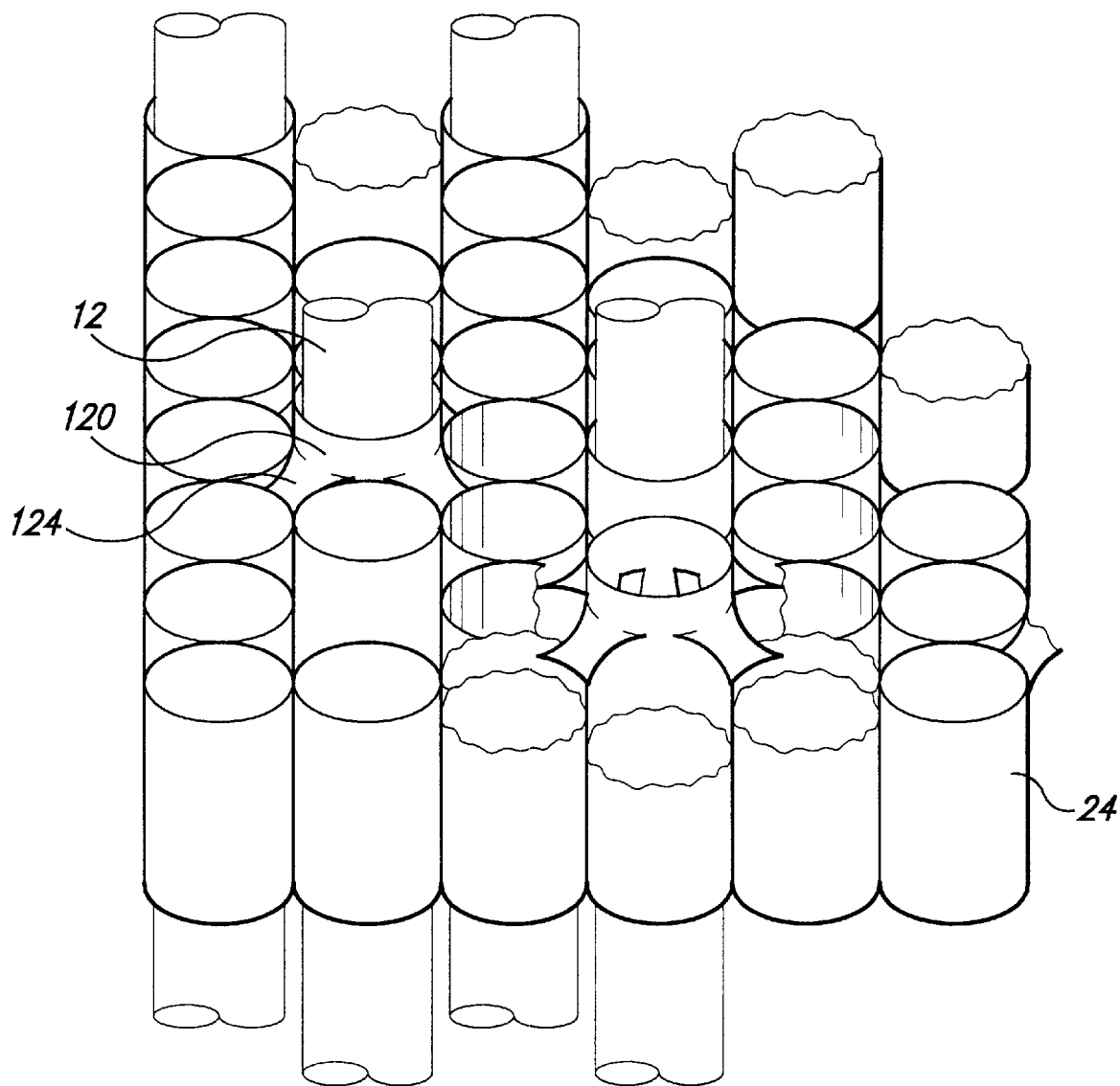
FIG. 16 is a perspective view of a spacer illustrating a flow diverter about a fuel rod through a spacer cell location.
Figure 17:
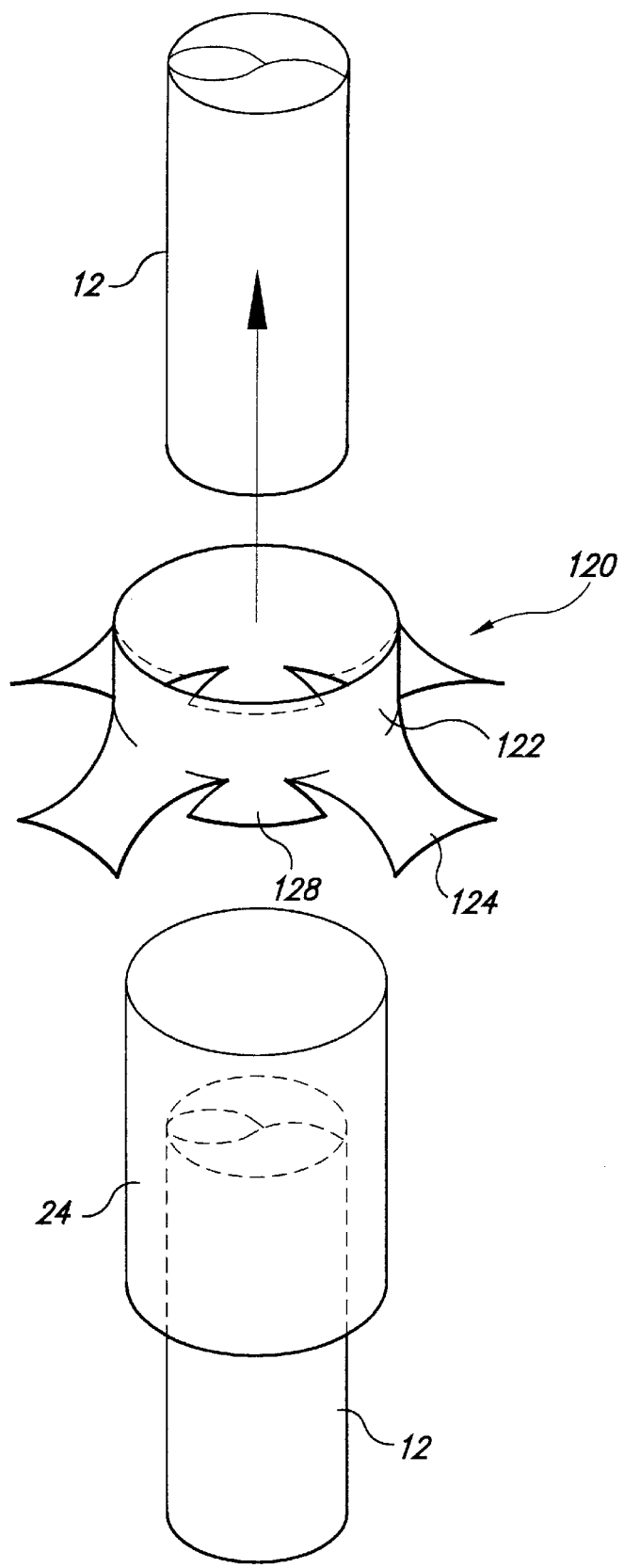
FIG. 17 is an exploded enlarged perspective view illustrating the flow diverter of FIG. 16.

Referring to the final embodiment of the present invention illustrated in FIGS. 16 and 17, there is provided a flow diverter 120 for use in conjunction with a cell 24 which receives a fuel rod 12. The flow diverter 120 comprises a cylindrical or tubular body 122 similarly as the tube 30 of the first embodiment for securement on the top of a cell 24, also as in the embodiment of FIGS. 2–9. Thus, body 122 includes tabs 124 constructed similarly as tabs 32 and which project into the spaces between the cells. The boiling water/moderator is thus diverted from flowing between the cells into an annular space between the flow diverter 120 and a fuel rod 12 within the cell 24 thus increasing in flow velocity and pressure, e.g., "supercharging" the flow. In FIG. 17, it will be appreciated that the base of the flow diverter includes a plurality of upstream extending projections 128 whereby the flow diverter may be secured, for example, by welding along the upper margin of a cell of the spacer. The cell flow diverter 120 may be located at any position in the spacer where it is desirable to increase the flow about the fuel rod extending through that cell location.

Figure 18:
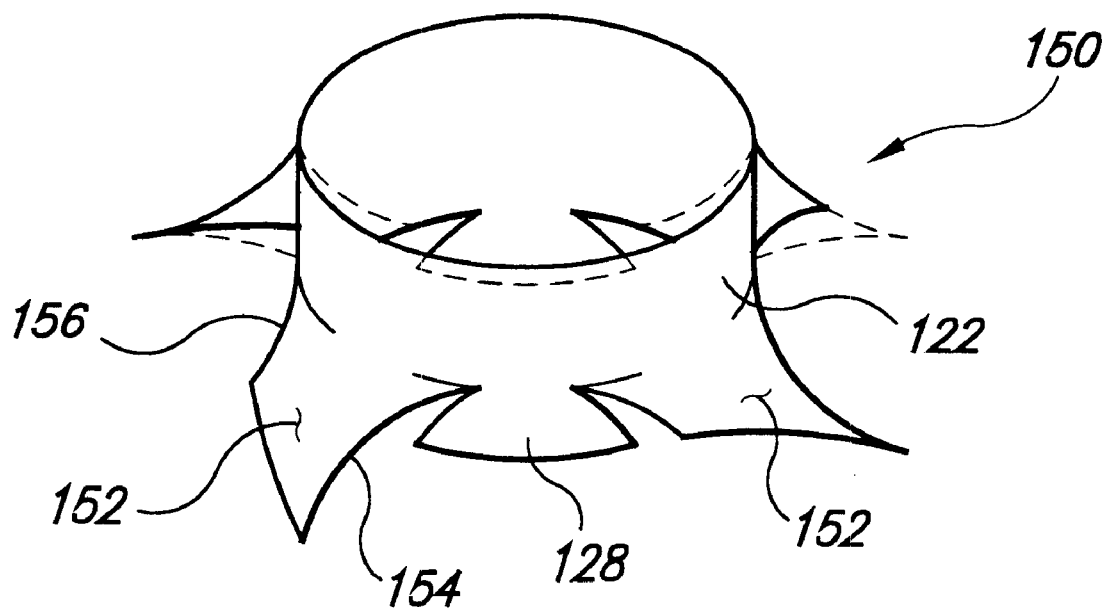
FIG. 18 is perspective view of a flow diverter in a further embodiment of the present invention.

Also, the tabs 124 can be cut to different lengths on opposite sides of one another, which when bent upwards would cause the coolant flow to swirl. Thus, as illustrated in FIG. 18, the flow diverter 150 has tabs 152 which have long and short sides or edges 154 and 156, respectively. When the tabs 152 are struck from the diverter 150, the tab twists such that flow through the diverter not only increases in velocity but is also swirled in the direction of the long sides 154 of the tabs 152. Thus, the tabs 152 are twisted to provide a swirl-type flow.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A flow diverter for diverting flow between cells of a spacer in a nuclear fuel bundle into the diverter and in a first downstream flow direction relative to the spacer, the spacer having a rectilinear array of cells, comprising:

a cylindrical tube for overlying a spacer cell and having an axis extending in first and second opposite axial directions, a plurality of tabs projecting laterally from said cylindrical tube adjacent a first end portion thereof and at perpendicular locations relative to one another about said axis for disposition in the spacer between diagonally adjacent cells of the rectilinear array thereof;

said tabs forming with said axis acute angles opening in the second axial direction for diverting flow through the spacer into said cylindrical tube in the first axial direction and toward the axis; and a vortex generator carried by said cylindrical tube adjacent a second end portion of said tube opposite said first end portion, said vortex generator including vanes extending from said tube in said first axial direction and spaced from said tabs for swirling the flow diverted through the cylindrical tube by said tabs.

2. A flow diverter according to claim 1 wherein said tabs are integral with the cylindrical tube.

3. A flow diverter according to claim 1 wherein said tabs have tips and arcuate side edges terminating in said tips, said side edges being arcuate for substantial conformance with arcuate side edges of diagonally adjacent spacer cells.

4. A flow diverter for diverting flow between cells of a spacer in a nuclear fuel bundle into the diverter and in a downstream flow direction relative to the spacer, the spacer having a rectilinear array of cells, comprising:

a cylindrical tube for overlying a spacer cell and having an axis, a plurality of tabs projecting laterally from said cylindrical tube at perpendicular locations relative to one another about said axis for disposition in the spacer between diagonally adjacent cells of the rectilinear array thereof;

said tabs forming with said axis acute angles for diverting flow through the spacer into said cylindrical tube;

a vortex generator carried by said cylindrical tube and including vanes for swirling the flow diverted through the cylindrical tube, said vortex generator comprising a cylindrical tube portion having an axis generally coincident with the axis of said flow diverter, said vanes extending integrally from said cylindrical tube portion in an axial direction and extending inwardly from walls of said tube portion such that an edge of each vane lies adjacent the axis of the cylindrical tube portion.

5. A flow diverter according to claim 4 wherein the tips of said vanes are welded to one another.

6. A flow diverter according to claim 5 wherein said vortex generator is removably mounted on said flow diverter.

7. A flow diverter according to claim 5 wherein said vortex generator comprises a second cylindrical tube having a plurality of locking projections, the first mentioned cylindrical tube having a plurality of slots therethrough for receiving said locking projections to releasably secure said second cylindrical tube and said first cylindrical tube to one another.

8. A flow diverter according to claim 7 wherein said projections comprise spring-biased tabs of the vortex generator.

9. A flow diverter according to claim 4 wherein said cylindrical tube portion includes a second cylindrical tube, said first and second tubes having complementary threads for releasably securing the first and second tubes to one another, said vanes extending inwardly in a direction tending to tighten the threads of said second cylinder on the threads of said first cylinder in response to flow through said vortex generator.

10. A flow diverter according to claim 1 wherein said vanes are twisted, said vanes lying within peripheral confines of said vortex generator tube.

11. A flow diverter according to claim 1 wherein said tabs are twisted to impart a swirl to the flow-diverted for flow through said tube.

12. A flow diverter according to claim 11 wherein said tabs have opposite edges, one edge being longer than an opposite edge.

13. A nuclear fuel bundle comprising:

a plurality of full-length nuclear fuel rods and at least one part-length rod, said fuel rods extending generally axially along the fuel bundle;

a plurality of spacers axially spaced from one another along the bundle, each said spacer having generally cylindrical side-by-side cells in cell positions arranged in parallel rows and parallel columns forming a generally rectilinear array of cells having parallel axes, certain of the cells of each spacer receiving the full-length fuel rods, one of said spacers spaced from an end of the part-length rod having an open cell in axial registration with the part-length rod;

a flow diverter including a cylindrical tube overlying said open cell and connected to said one spacer, said tube having an axis generally coincident with the axis of said open cell, a plurality of tabs projecting laterally from said cylindrical tube at perpendicular locations relative to one another about said axis, each tab extending diagonally relative to said rectilinear array of columns and rows of said cells into spaces between diagonally adjacent cells;

said tabs forming with said axis acute angles opening in an upstream direction for diverting flow through openings between the cells of the spacer into said cylindrical tube; and a vortex generator carried by said cylindrical tube downstream of said tabs for swirling the flow diverted through the cylindrical tube.

14. A nuclear fuel bundle according to claim 13 wherein each of said tabs terminates in a tip extending beyond a straight line interconnecting centers of diagonally adjacent cells between which the tab projects.

15. A nuclear fuel bundle according to claim 13 wherein said tabs are integral with the cylindrical tube.

16. A nuclear fuel bundle according to claim 13 wherein said tabs have tips and arcuate side edges terminating in said tips, said side edges being arcuate and in substantial conformance with the arcuate side edges of said diagonally adjacent cells.

17. A nuclear fuel bundle according to claim 13 including four tabs perpendicular to one another about said cylindrical tube, each tab extending diagonally relative to said rectilinear array of columns and rows of said cells into spaces between diagonally pairs of cells, a cell of each pair of diagonally adjacent cells being common to an adjacent pair of diagonally adjacent cells between which a tab extends.

18. A flow diverter/spacer combination for diverting flow between cells of a spacer in a nuclear fuel bundle for flow within the diverter and in a downstream flow direction relative to the spacer, comprising:

a spacer having generally cylindrical side-by-side cells in cell positions arranged in parallel rows and parallel columns forming a generally rectilinear array of cells, the cells having parallel axes;

a cylindrical tube overlying a cell of and connected to the spacer and having an axis generally coincident with the axis of the cell, a plurality of tabs projecting laterally from said cylindrical tube at perpendicular locations relative to one another about said axis, each tab extending diagonally relative to said rectilinear array of columns and rows of said cells into spaces between diagonally adjacent cells;

said tabs forming with said axis acute angles opening in an upstream direction for diverting flow through openings between the cells of the spacer into said cylindrical tube; and a vortex generator carried by said cylindrical tube downstream of said tabs for swirling the flow diverted through the cylindrical tube;

said vortex generator including a cylindrical tube portion having integral vanes extending axially in a downstream direction and curved inwardly from walls of said cylindrical tube portion such that an edge of each vane lies adjacent the axis of the cylindrical tube portion.

19. A flow diverter/spacer combination according to claim 18 wherein the tips of said vanes are welded to one another.

20. A flow diverter/spacer combination according to claim 13 wherein said vortex generator is removably mounted on said flow diverter.

21. A flow diverter/spacer combination according to claim 20 wherein said vortex generator comprises a second cylindrical tube having a plurality of locking projections, the first mentioned cylindrical tube having a plurality of slots therethrough for receiving said locking projections to releasably secure said second cylindrical tube and said first cylindrical tube to one another.

22. A flow diverter/spacer combination according to claim 21 wherein said projections comprise spring-biased tabs of the vortex generator.

23. A flow diverter/spacer combination according to claim 18 wherein said cylindrical tube portion includes a second cylindrical tube, said first and second tubes having complementary threads for releasably securing the first and second tubes to one another, said vanes being curved inwardly in a direction tending to tighten the threads of said second cylinder on the threads of said first cylinder in response to flow through said vortex generator.

24. A flow diverter/spacer combination according to claim 13 wherein said vortex generator includes vanes extending axially in a downstream direction and twisted inwardly so that an edge of each vane lies adjacent the axis of said cell, said tabs and said vanes being formed integrally with said first cylindrical tube.

25. A flow diverter/spacer combination according to claim 13 wherein said tabs are twisted to afford a swirl to the flow diverted by the diverter and into the cylindrical tube.

26. A nuclear fuel bundle according to claim 13 wherein said vortex generator includes vanes integral with said cylindrical tube portion and extends axially in a downstream direction, said vanes being curved inwardly from walls of said cylindrical tube portion such that an edge of each vane lies adjacent the axis of the cylindrical tube portion.

27. A flow diverter according to claim 1 wherein said vanes extend generally in said first axial direction and are twisted such that one edge of each vane lies inboard of said tube and another edge of each vane lies generally along the circumference of the tube.

28. A flow diverter according to claim 1 wherein said cylindrical tube has apertures in lateral registration with said tabs, respectively, for receiving the diverted flow.

29. A nuclear fuel bundle according to claim 13 wherein said cylindrical tube has apertures in lateral registration with said tabs, respectively, for receiving the diverted flow for flow in a downstream direction within the cylindrical tube.

30. A nuclear fuel bundle according to claim 29 wherein said vanes extend generally in said first axial direction and are twisted such that one edge of each vane lies inboard of said tube and another edge of each vane lies generally along the circumference of the tube.

\* \* \* \* \*